(12) United States Patent
Chen et al.

(10) Patent No.: US 10,660,009 B2
(45) Date of Patent: May 19, 2020

(54) LINKAGE AND INDICATION OF HARQ PACKET TRANSMISSIONS AND PARAMETERS FOR URLLC IN NR

(71) Applicant: QUALCOMM Incorporated, San Diego, CA (US)

(72) Inventors: Wanshi Chen, San Diego, CA (US); Jing Jiang, San Diego, CA (US); Tingfang Ji, San Diego, CA (US); Peter Gaal, San Diego, CA (US); Chong Li, Weehawken, NJ (US); Chih Ping Li, San Diego, CA (US); Hao Xu, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/637,618

(22) Filed: Jun. 29, 2017

(65) Prior Publication Data
US 2018/0049097 A1    Feb. 15, 2018

Related U.S. Application Data

(60) Provisional application No. 62/374,502, filed on Aug. 12, 2016.

(51) Int. Cl.
*G06F 11/14* (2006.01)
*H04W 40/12* (2009.01)
(Continued)

(52) U.S. Cl.
CPC ............ *H04W 40/12* (2013.01); *H04L 1/0003* (2013.01); *H04L 1/1812* (2013.01);
(Continued)

(58) Field of Classification Search
None
See application file for complete search history.

(56) References Cited

U.S. PATENT DOCUMENTS 9,306,719 B2     4/2016  Kaur et al.
2002/0172208 A1* 11/2002  Malkamaki ........... H04L 1/0083
                                                     370/400
(Continued)

OTHER PUBLICATIONS

Ericsson: "E-DCH Physical Layer Hybrid ARQ Processing", 3GPP Draft; R1-041179, 3rd Generation Partnership Project (3GPP), Mobile Competence Centre; 650, Route Des Lucioles; F-06921 Sophia-Antipolis Cedex; France, vol. RAN WG1, No. Seoul, Korea; Sep. 15, 2004, Sep. 15, 2004, XP050099375, [retrieved on Sep. 15, 2004], 3 pages.

(Continued)

*Primary Examiner* — Sithu Ko
(74) *Attorney, Agent, or Firm* — Patterson & Sheridan, LLP

(57) ABSTRACT

Aspects of the present disclosure relate to wireless communications and, more particularly, to linkage of packet transmissions for ultra-reliable low-latency communications (URLLC) in new radio (NR). A method for wireless communications that may be performed by a user equipment (UE) is provided. The method generally includes receiving a current transmission of a packet; determining, based on the current packet transmission, one or more previous transmissions of the packet occurred and at least one parameter associated with the one or more previous transmissions; and combining the current packet transmission with the previous transmissions based, at least in part, on the determination.

32 Claims, 12 Drawing Sheets

(51) Int. Cl.
*H04L 1/18* (2006.01)
*H04L 1/00* (2006.01)
*H04W 16/32* (2009.01)
*H04W 72/04* (2009.01)
*H04W 88/02* (2009.01)

(52) U.S. Cl.
CPC .......... *H04L 1/1819* (2013.01); *H04L 1/1845* (2013.01); *H04L 1/1896* (2013.01); *H04W 16/32* (2013.01); *H04W 72/0406* (2013.01); *H04W 72/0446* (2013.01); *H04L 1/1825* (2013.01); *H04W 88/02* (2013.01)

(56) References Cited

U.S. PATENT DOCUMENTS

| | | | |
|---|---|---|---|
| 2004/0042492 A1* | 3/2004 | Suzuki | H04B 7/2643 370/473 |
| 2005/0250454 A1* | 11/2005 | Sebire | H04L 1/1845 455/67.11 |
| 2008/0212541 A1* | 9/2008 | Vayanos | H04L 1/1845 370/335 |
| 2010/0325502 A1* | 12/2010 | Lindskog | H04L 1/1657 714/748 |
| 2012/0159278 A1* | 6/2012 | Jen | H04L 1/1819 714/751 |
| 2013/0215862 A1* | 8/2013 | Suzuki | H04W 72/0446 370/329 |
| 2014/0185534 A1* | 7/2014 | Vos | H04L 1/1819 370/329 |
| 2014/0211722 A1* | 7/2014 | Pietraski | H04L 1/1812 370/329 |
| 2014/0241269 A1* | 8/2014 | Smee | H04W 72/042 370/329 |
| 2014/0376358 A1* | 12/2014 | Eder | H04L 1/1845 370/216 |
| 2015/0358123 A1* | 12/2015 | Terry | H04L 1/1816 370/329 |
| 2016/0056926 A1 | 2/2016 | Li et al. | |
| 2016/0192383 A1 | 6/2016 | Hwang et al. | |
| 2016/0204907 A1 | 7/2016 | Chen et al. | |
| 2016/0219627 A1 | 7/2016 | Au et al. | |

OTHER PUBLICATIONS

HTC: "DL HARQ in LAA" 3GPP Draft; R1-153025, 3rd Generation Partnership Project (3GPP), Mobile Competence Centre; 650, Route Des Lucioles; F-06921 Sophia-Antipolis Cedex; France, vol. RAN WG1, No. Fukuoka. Japan; May 25, 2015-May 29, 2015 May 16, 2015, XP050972861, Retrieved from the Internet: URL:http://www.3gpp.org/ftp/tsg_ran/WG1_RL1/TSGR1_81/Docs/ [retrieved on May 16, 2015], 2 pages.

Huawei et al., "Preventing UL HARQ Transmissions without MCS Information", 3GPP Draft; R2-084371 Preventing UL HARQ Transmissions without MCS Information, 3rd Generation Partnership Project (3GPP), Mobile Competence Centre; 650, Route Des Lucioles; F-06921 Sophia-Antipolis Cedex; France, vol. RAN WG2, No. Jeju, Korea; Aug. 18, 2008-Aug. 22, 2008, Aug. 12, 2008, XP050603979, [retrieved on Aug. 12, 2008], 4 pages.

International Search Report and Written Opinion—PCT/US2017/040268—ISA/EPO—Feb. 1, 2018.

NTT Docomo: Design and Feature for PUSCH, 3GPP Draft; R1-160167 NB-IOT PUSCH Design V1, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 18, 2016-Jan. 20, 2016 Jan. 12, 2016, XP051064771, Retrieved from the Internet: URL:http://www.3gpp.org/ftp/tsg_ran/WG1_RL1/TSGR1_AH/LTE_NB-IoT_1601/Docs/ [retrieved on Jan. 12, 2016], 4 pages.

NTT Docomo: "Views on Remaining Issues of DCI", 3GPP Draft; R1-157344 Views on Remaining Issues of DCI, 3rd Generation Partnership Project (3GPP), Mobile Competence Centre; 650, Route Des Lucioles; F-06921 Sophia-Antipolis Cedex; France, vol. RAN WG1, No. Anaheim, USA; Nov. 15, 2015-Nov. 22, 2015 Nov. 7, 2015, XP051022747, Retrieved from the Internet: URL:http://www.3gpp.org/ftp/tsg_ran/WG1_RL1/TSGR1_83/Docs/ [retrieved on Nov. 7, 2015], 4 pages.

NTT Docomo: "Views on Remaining Issues of NB-PDCCH", 3GPP Draft; R1-163167 NB-PDCCH, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016 Apr. 5, 2016 (Apr. 5, 2016), XP051080671, Retrieved from the Internet: URL:http://www.3gpp.org/ftp/tsg_ran/WG1_RL1/TSGR1_84b/Docs/ [retrieved on Apr. 5, 2016], 4 pages.

Motorola: "HARQ Considerations for E-UTRA," 3GPP Draft; R1-060395_HARQ Considerations, 3rd Generation Partnership Project (3GPP), Mobile Competence Centre; 650, Route Des Lucioles; F-06921 Sophia-Antipolis Cedex; France, vol. RAN WG1, No. Denver, USA; Feb. 9, 2006, Feb. 9, 2006 (Feb. 9, 2006), XP050101340, 5 pages, [retrieved on Feb. 9, 2006].

Partial International Search Report—PCT/US2017/040268—ISA/EPO—Oct. 6, 2017.

* cited by examiner

US 10,660,009 B2

LINKAGE AND INDICATION OF HARQ PACKET TRANSMISSIONS AND PARAMETERS FOR URLLC IN NR

CROSS-REFERENCE TO RELATED APPLICATION & PRIORITY CLAIM

This application claims benefit of and priority to U.S. Provisional Patent Application Ser. No. 62/374,502, filed Aug. 12, 2016, which is herein incorporated by reference in its entirety for all applicable purposes.

FIELD OF THE DISCLOSURE

Aspects of the present disclosure generally relate to wireless communication and, more particularly, to linkage of packet transmissions for ultra-reliable low-latency communications (URLLC) in new radio (NR).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. LTE/LTE-Advanced is a set of enhancements to the Universal Mobile Telecommunications System (UMTS) mobile standard promulgated by Third Generation Partnership Project (3GPP).

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, access point (AP), radio head, TRP (transmit receive point, transmission reception point, etc.), new radio (NR) BS, 5G NB, etc.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to linkage of packet transmissions for ultra-reliable low-latency communications (URLLC) in new radio (NR).

Certain aspects of the present disclosure provide a method for wireless communication by a user equipment (UE). The method generally includes receiving a current transmission of a packet; determining, based on the current packet transmission, one or more previous transmissions of the packet occurred and at least one parameter associated with the one or more previous transmissions; and combining the current packet transmission with the previous transmissions based, at least in part, on the determination.

Certain aspects of the present disclosure provide an apparatus for wireless communication by a UE. The apparatus generally includes means for receiving a current transmission of a packet; means for determining, based on the current packet transmission, one or more previous transmissions of the packet occurred and at least one parameter associated with the one or more previous transmissions; and means for combining the current packet transmission with the previous transmissions based, at least in part, on the determination.

Certain aspects of the present disclosure provide an apparatus for wireless communication by a UE. The apparatus generally includes at least one processor configured to receive a current transmission of a packet; determine, based on the current packet transmission, one or more previous transmissions of the packet occurred and at least one parameter associated with the one or more previous transmissions; and combine the current packet transmission with the previous transmissions based, at least in part, on the determination; and a memory coupled with the at least one processor.

Certain aspects of the present disclosure provide a computer readable medium having computer executable code stored thereon for wireless communication by UE. The code generally includes code for receiving a current transmission of a packet; code for determining, based on the current packet transmission, one or more previous transmissions of the packet occurred and at least one parameter associated with the one or more previous transmissions; and code for combining the current packet transmission with the previous transmissions based, at least in part, on the determination.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
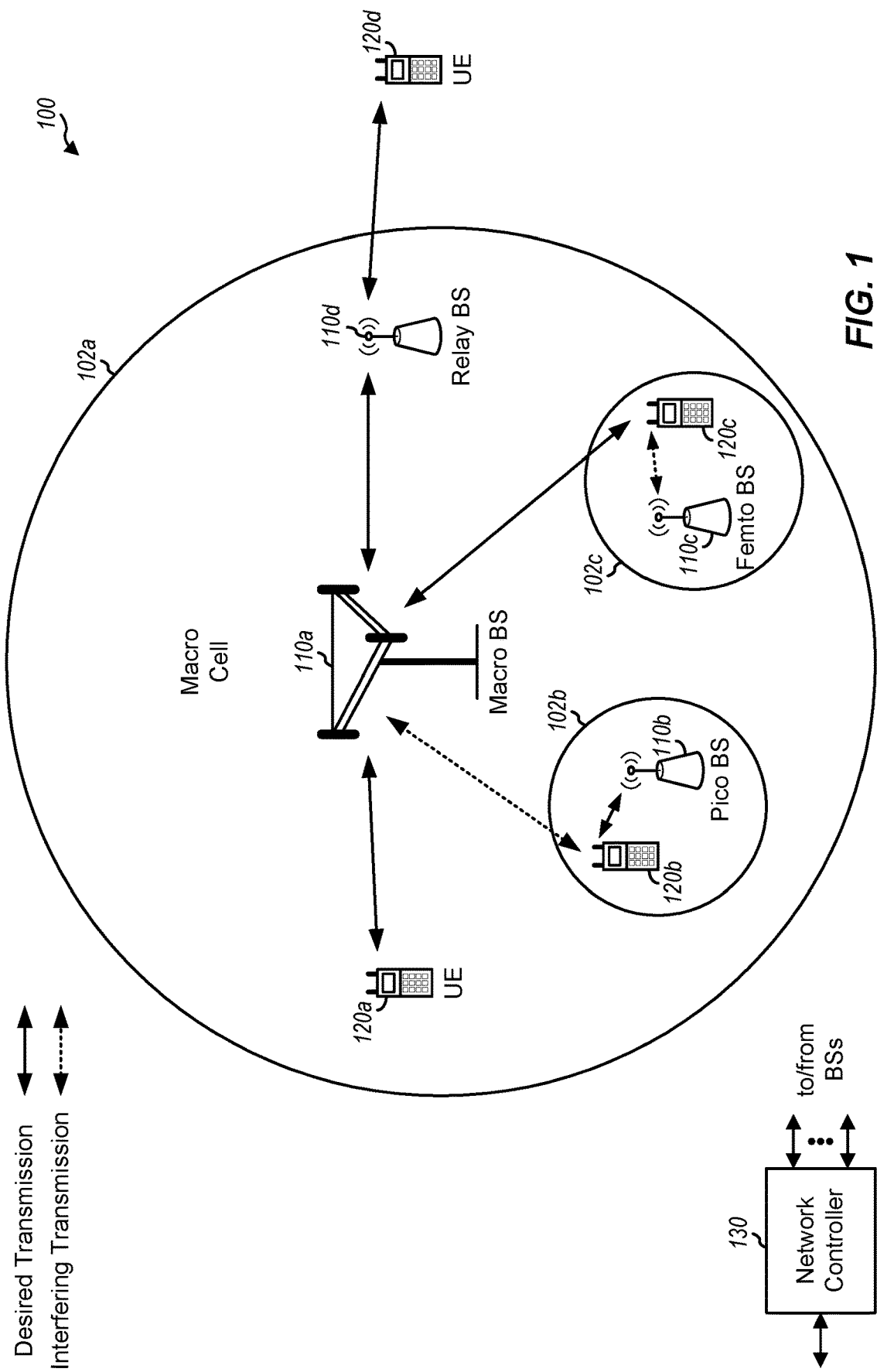
FIG. 1 illustrates an example of a wireless communication network, in accordance with certain aspects of the present disclosure.

Aspects of the present disclosure provide apparatus, methods, processing systems, and computer program products for new radio (NR) (new radio access technology or 5G technology). New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service. The RAN may include a central unit (CU) and distributed units (DUs). A NR Node B (e.g., 5G Node B) may correspond to one or multiple transmission reception points (TRPs).

As described herein, transmission requirements for URLLC may be stringent and, thus, hybrid automatic repeat request (HARQ) operations may be desirable to help achieve target error rates.

Aspects described herein provide methods and apparatus for performing combining of a current packet transmission with previous HARQ transmissions (e.g., buffered samples of missed packet transmissions) of the packet. As will be described in further detail herein, in order to effectively perform the combining, the UE may need to be aware of previous HARQ transmissions, for example, which may not have been decoded if the UE missed the associated control channel. Aspects of the present disclosure relate to linkage and indication of HARQ packet transmissions (e.g., physical downlink shared channel (PDSCH) for URLLC in NR. By receiving an indication in a current packet transmission (e.g., an explicit indication or an implicit indication based on linkage of parameters), the UE can be aware of previous HARQ transmissions of the packet and parameters associated with the previous HARQ transmissions, which the UE can use for better channel estimation and HARQ combining.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as NR (e.g., 5G radio access) global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communication technology under development in conjunction with the 5G Technology Forum (5GTF). The techniques described herein may be used for the wireless networks and radio technologies mentioned above as well as other wireless networks and radio technologies. LTE and LTE-Advanced (LTE-A) are referred to generally as LTE. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications Network

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. FIG. 1 illustrates an example access network 100, in which aspects of the present disclosure may be practiced, for example, techniques for linkage of packet transmissions for ultra-reliable low-latency communications (URLLC) in new radio (NR).

For example, a user equipment (UE) 120 may receive a current packet transmission (e.g., a hybrid automatic repeat request (HARQ) retransmission) from a base station (BS) 110. Based on the current packet transmission, the UE 120 can determine that previous transmissions of the packet have occurred and parameters associated with the previous transmissions. For example, based on an explicit indication in a control channel associated with the current packet transmission, or implicitly based on a linkage of the parameters of the current and previous transmissions.

Access network 100 may be a long term evolution (LTE) network or some other wireless network, such as a NR or 5G network. Access network 100 may include a number of BSs 110 and other network entities (e.g., although not shown, access network 100 may include a central unit).

A BS is an entity that communicates with UEs and may also be referred to as a node B (NB), an evolved Node B (eNB), an access point (AP), a distributed unit (DU), a transmission reception point (TRP), a gNB, 5G BS, NR BS, 5G NB, etc. Each BS may provide communication coverage for a particular geographic area. In 3GPP, the term "cell" can refer to a coverage area of a Node B and/or a Node B subsystem serving this coverage area, depending on the context in which the term is used.

In NR systems, the term "cell" and NB, eNB, AP, DU, TRP, gNB, 5G BS, 5G NB, or NR BS may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in access network 100 through various types of backhaul interfaces such as a direct physical connection, a virtual network, or the like using any suitable transport network.

A BS may provide communication coverage for a macro cell, a pico cell, a femto cell, and/or other types of cell (e.g., ACells and/or DCells). A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

Access network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay station 110d may communicate with macro BS 110a and a UE 120d in order to facilitate communication between BS 110a and UE 120d. A relay station may also be referred to as a relay BS, a relay, etc.

Access network 100 may be a heterogeneous network that includes a BS of different types, e.g., macro BS, pico BS, femto BS, relay BS, etc. These different types of BS may have different transmit power levels, different coverage areas, and different impact on interference in access network 100. For example, macro BS may have a high transmit power level (e.g., 5 to 40 Watts) whereas pico BS, femto BS, and relay BS may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, for example, directly or indirectly via a wireless or wireline backhaul.

UEs 120 (e.g., 120a, 120b, 120c) may be dispersed throughout access network 100, and each UE may be stationary or mobile. A UE may also be referred to as an access terminal, a terminal, a mobile station, a subscriber unit, a station, a customer premises equipment (CPE), etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
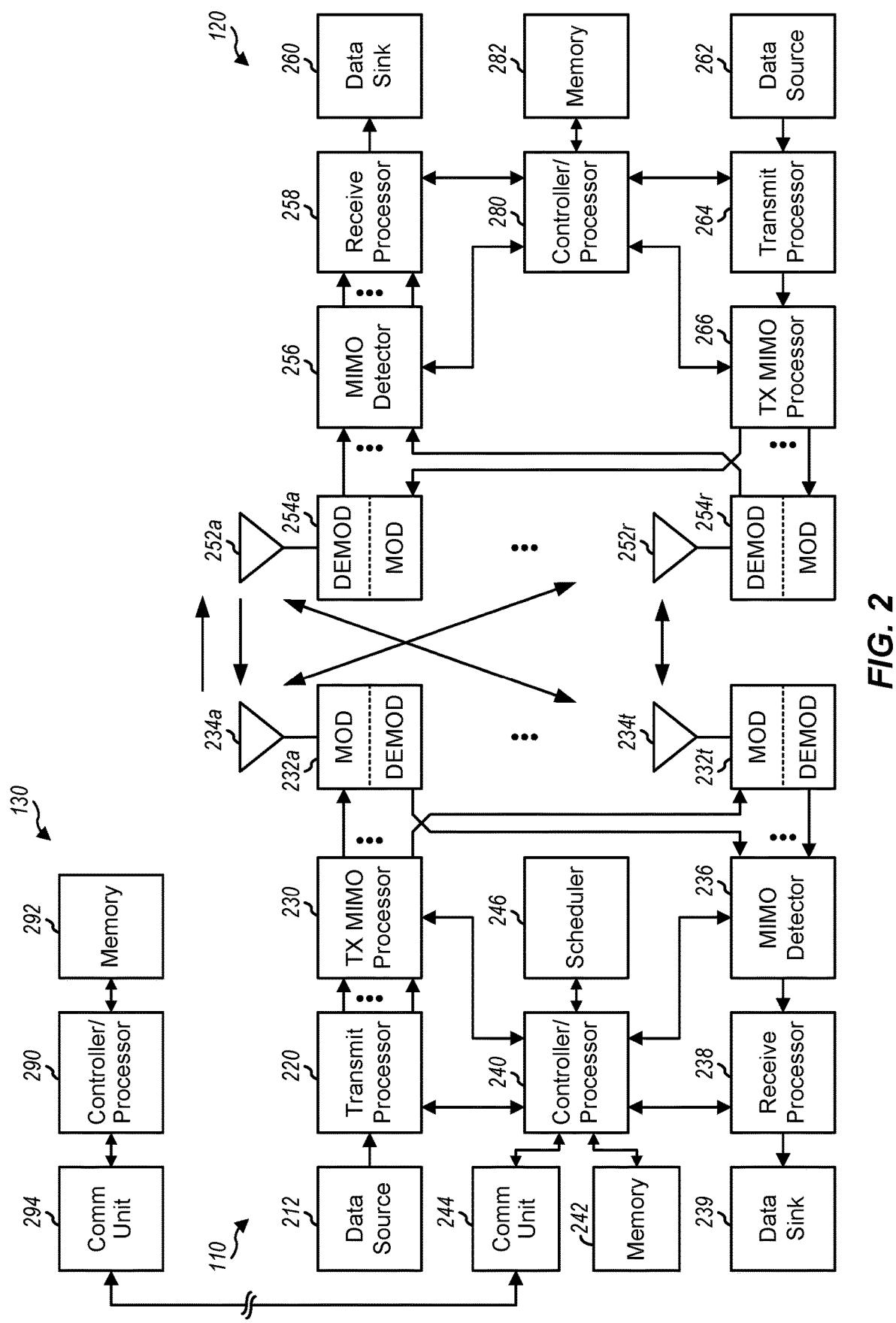
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the BS and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal receive power (RSRP), reference signal strength indicator (RSSI), reference signal receive quality (RSRQ), CQI, interference covariance matrix information (Rnn), etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

One or more modules illustrated in FIG. 2 may be configured to perform the operations described herein for linkage of packet transmissions for ultra-reliable low-latency communications (URLLC) in new radio (NR). For example, controllers/processors 240 and 280 may direct the operation at BS 110 and UE 120, respectively, to perform techniques presented herein and illustrated in FIGS. 10-15. At BS 110, controller/processor 240, scheduler 246, mod/demod 232, and/or antenna 234 may be configured to perform the recited and described operations. At UE 120, controller/processor 280, mod/demod 254, and antenna 252 may be configured to perform the recited and described operations, such as operations 1000 illustrated in FIG. 10.

Memories 242 and 282 may store data and program codes for base station 110 and UE 120, respectively. Scheduler 246 may schedule UEs for data transmission on the downlink and/or uplink.

Figure 3:
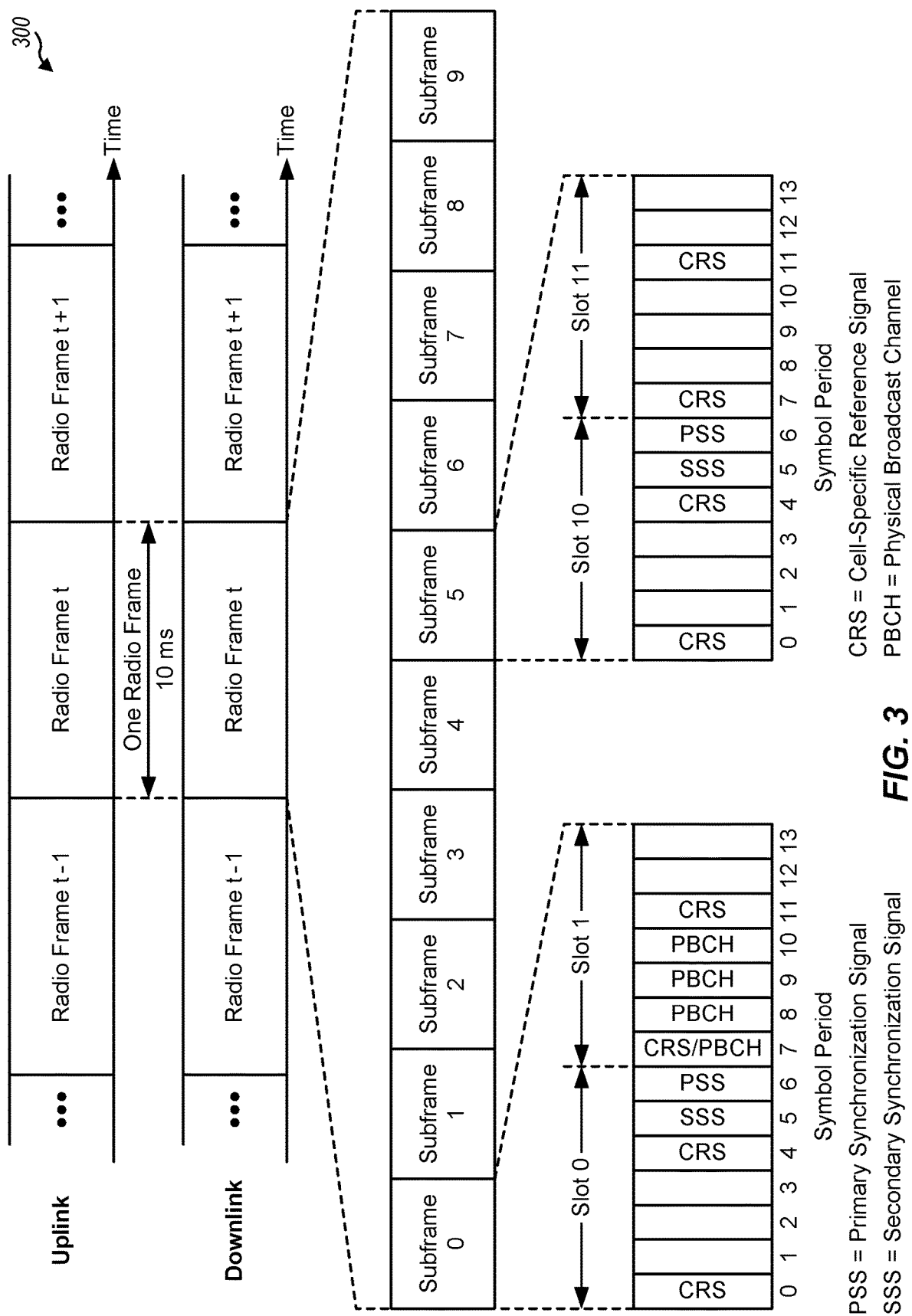
FIG. 3 is a block diagram conceptually illustrating an example of a frame structure in a wireless communications network, in accordance with certain aspects of the present disclosure.

FIG. 3 shows an exemplary frame structure 300 using frequency division duplexing (FDD) in an access network, such as access network 100. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain wireless communication systems (e.g., LTE), a BS may transmit a PSS and SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a CRS across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe. In other systems, a BS may transmit these or other signals in these locations or in different locations of the subframe.

In other systems (e.g., such NR or 5G systems), the BS may transmit these or other signals in these locations or in different locations of the subframe.

Figure 4:
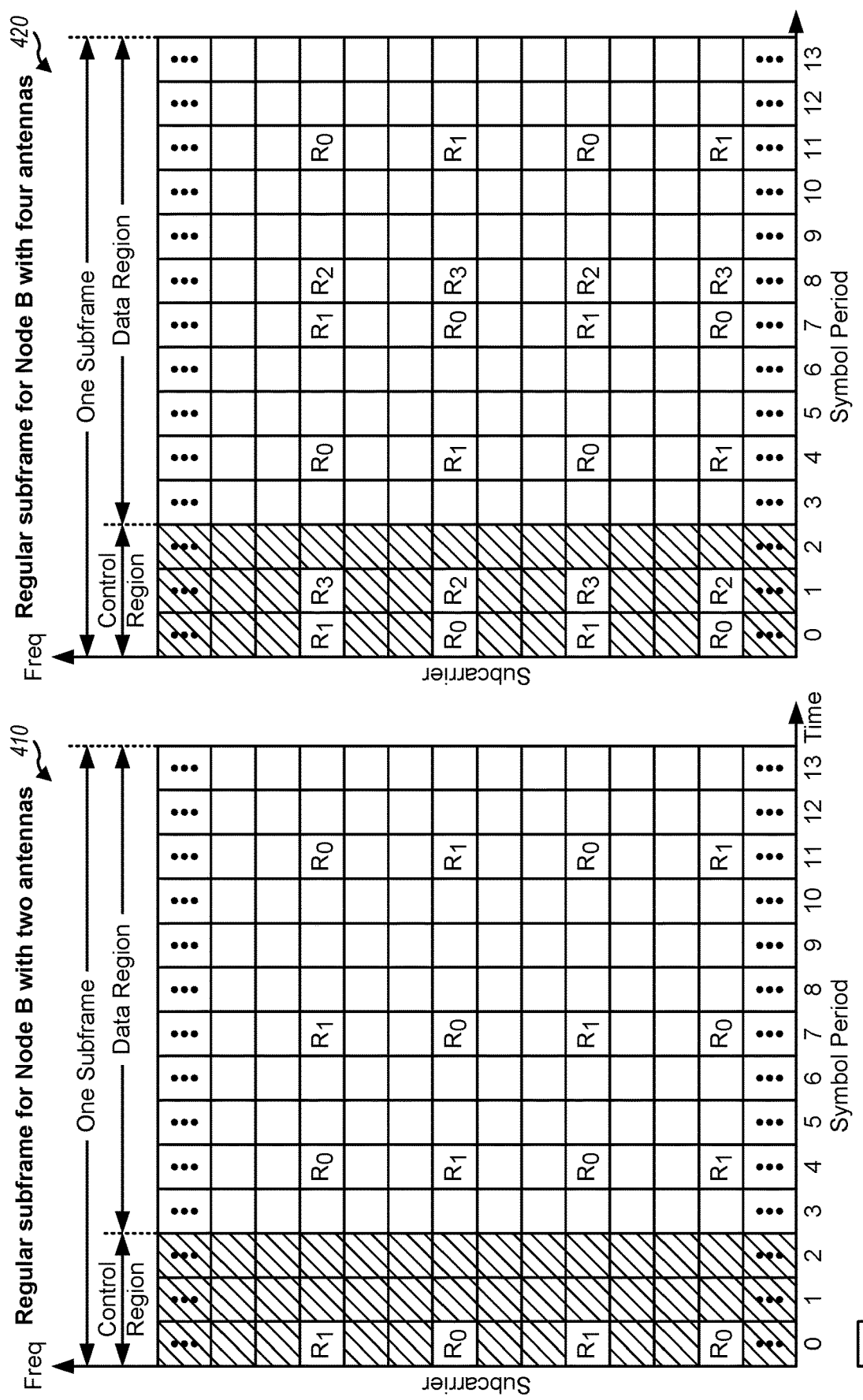
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block (RB) may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label $R_a$, a modulation symbol may be transmitted on that RE from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain wireless communication systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a RSRQ, or some other metric. The UE may operate in a dominant interference scenario in which the UE may observe high interference from one or more interfering BSs.

In other systems, a BS may transmit these or other signals in these locations or in different locations of the subframe.

Figure 5:
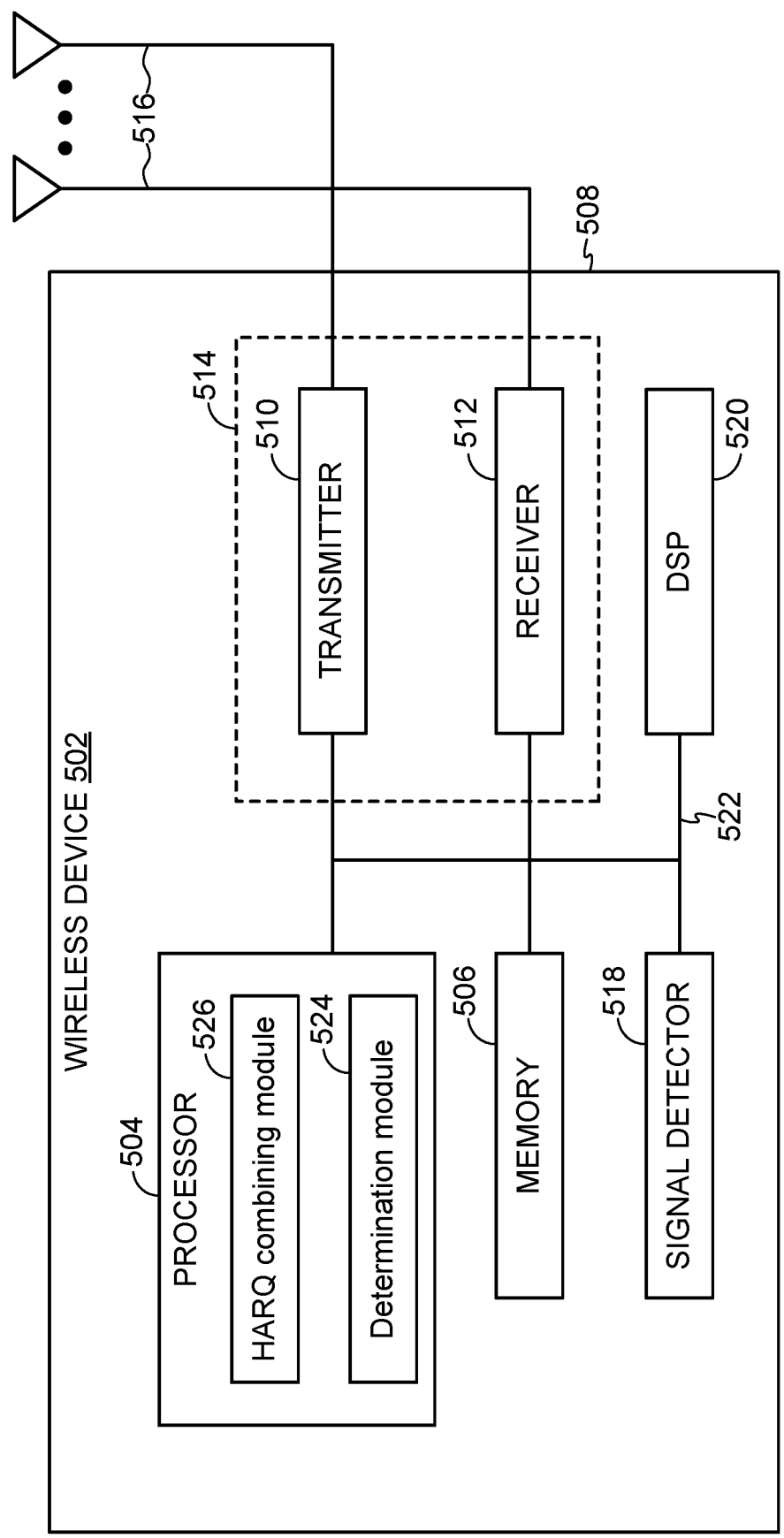
FIG. 5 illustrates various components that may be utilized in a wireless device, in accordance with certain aspects of the present disclosure.

FIG. 5 illustrates various components that may be utilized in a wireless device 502 that may be employed within access network 100 illustrated in FIG. 1. Wireless device 502 is an example of a device that may be configured to implement the various methods described herein for linkage of packet transmissions for URLLC in NR. Wireless device 502 may be a BS 110 or any of the wireless nodes (e.g., UEs 120). For example, wireless device 502 may be configured to perform operations 1000 illustrated in FIG. 10 as well as other operations described herein.

Wireless device 502 may include a processor 504 that controls operation of wireless device 502. Processor 504 may also be referred to as a central processing unit (CPU). Memory 506, which may include both read-only memory (ROM) and random access memory (RAM), provides instructions and data to the processor 504. A portion of memory 506 may also include non-volatile random access memory (NVRAM). Processor 504 typically performs logical and arithmetic operations based on program instructions stored within memory 506. The instructions in memory 506 may be executable to implement the methods described herein. Some non-limiting examples of processor 504 may include Snapdragon processor, application specific integrated circuits (ASICs), programmable logic, etc.

Wireless device 502 may also include housing 508 that may include transmitter 510 and receiver 512 to allow transmission and reception of data between wireless device 502 and a remote location. Transmitter 510 and receiver 512 may be combined into a transceiver 514. A single transmit antenna or a plurality of transmit antennas 516 may be attached to the housing 508 and electrically coupled to the transceiver 514. Wireless device 502 may also include (not shown) multiple transmitters, multiple receivers, and multiple transceivers. The wireless device 502 can also include wireless battery charging equipment.

Wireless device 502 may also include signal detector 518 that may be used in an effort to detect and quantify the level of signals received by transceiver 514. Signal detector 518 may detect such signals as total energy, energy per subcarrier per symbol, power spectral density and other signals. Wireless device 302 may also include a digital signal processor (DSP) 520 for use in processing signals.

The various components of wireless device 502 may be coupled together by bus system 522, which may include a power bus, a control signal bus, and a status signal bus in addition to a data bus. Processor 504 may be configured to access instructions stored in memory 506 to perform linkage of packet transmissions for URLLC in NR, in accordance with aspects of the present disclosure discussed below. For example, wireless device 502 may receive a current transmission of a packet at receiver 512. Processor 504 may include a determination module 524 configured to determine, based on the current packet transmission, one or more previous transmissions of the packet occurred and at least one parameter associated with the one or more previous transmissions. Processor 504 may include a HARQ combining module 526 configured to combine the current packet transmission with the previous transmissions based, at least in part, on the determination of determination module 524.

Example NR Architecture

While aspects of the examples described herein may be associated with LTE technologies, aspects of the present disclosure may be applicable with other wireless communications systems, such as new radio (NR) or 5G technologies.

NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 8 and 9.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

Figure 6:
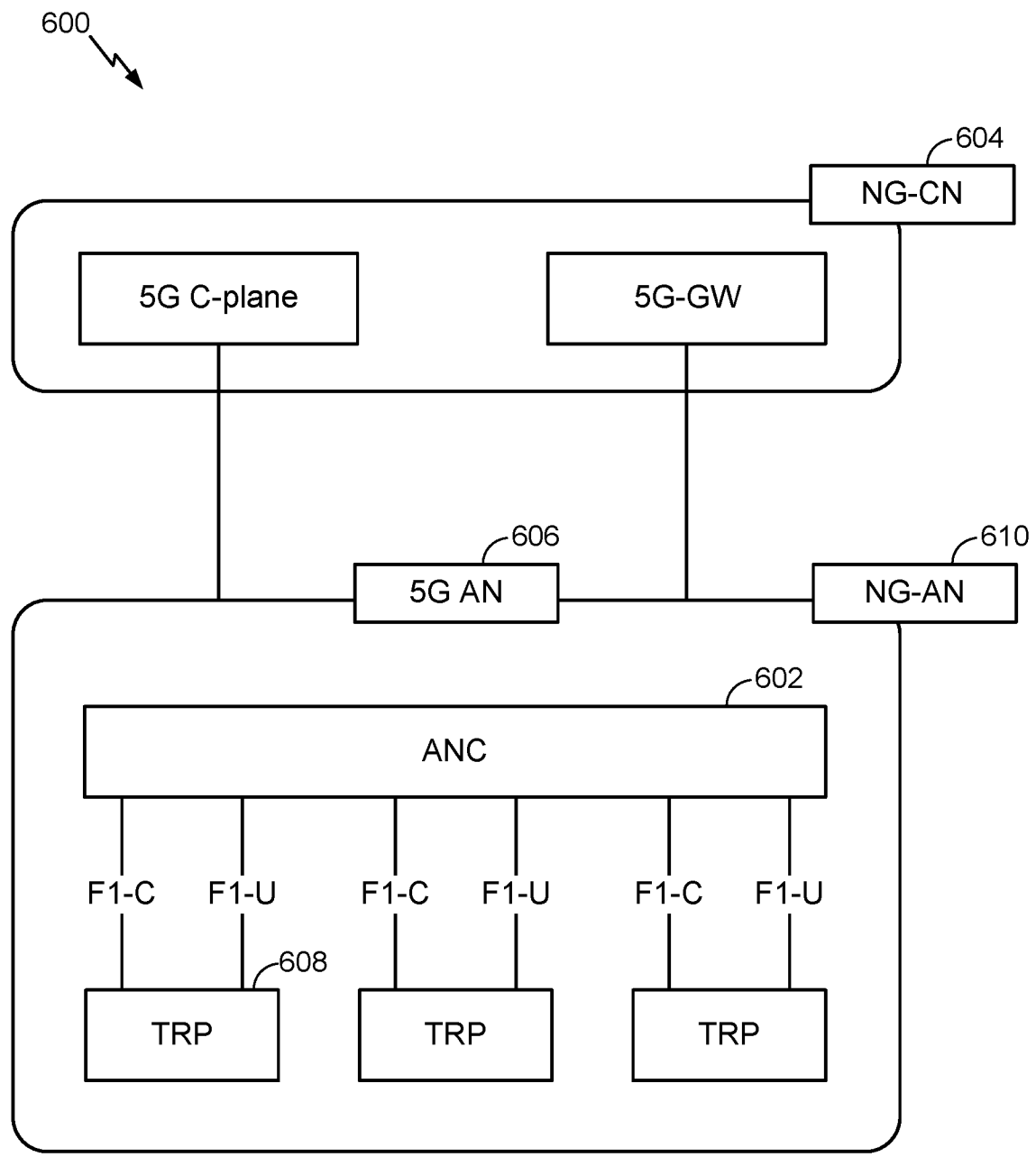
FIG. 6 illustrates a logical architecture of a distributed radio access network (RAN), in accordance with certain aspects of the present disclosure.

FIG. 6 illustrates an example logical architecture 600 of a distributed RAN, according to aspects of the present disclosure. A 5G access node 606 may include an access node controller (ANC) 602. The ANC may be a central unit (CU) of the distributed RAN 600. The backhaul interface to the next generation core network (NG-CN) 604 may terminate at ANC 602. The backhaul interface to neighboring next generation access nodes (NG-ANs) 610 may terminate at ANC 602. ANC 602 may include one or more TRPs 608 (which may also be referred to as BS, gNB, NB, eNB, 5G NB, AP, NR BS, or some other term). As described above, a TRP may be used interchangeably with "cell."

TRPs 608 may comprise a distributed unit (DU). TRPs 608 may be connected to one ANC (e.g., ANC 602) or more than one ANC (not illustrated). For example, for RAN sharing, radio as a service (RaaS), and service specific AND deployments, TRPs 608 may be connected to more than one ANC. A TRP may include one or more antenna ports. TRPs 608 may be configured to individually (e.g., dynamic selection) or jointly (e.g., joint transmission) serve traffic to a UE.

Logical architecture 600 may be used to illustrate fronthaul definition. Logical architecture 600 may be defined to support fronthauling solutions across different deployment types. For example, logical architecture 600 may be based on transmit network capabilities (e.g., bandwidth, latency, and/or jitter). Logical architecture 600 may share features and/or components with LTE. The NG-AN 610 may support dual connectivity with NR. NG-AN 610 may share a common fronthaul for LTE and NR. Logical architecture 600 may enable cooperation between and among TRPs 608. For example, cooperation may be preset within a TRP and/or across TRPs via the ANC 602. In some cases, no inter-TRP interface may be needed/present. A dynamic configuration of split logical functions may be present within logical architecture 600. The packet data convergence protocol (PDCP), radio link control (RLC), medium access control (MAC) protocols may be adaptably placed at ANC 602 or TRP608.

Figure 7:
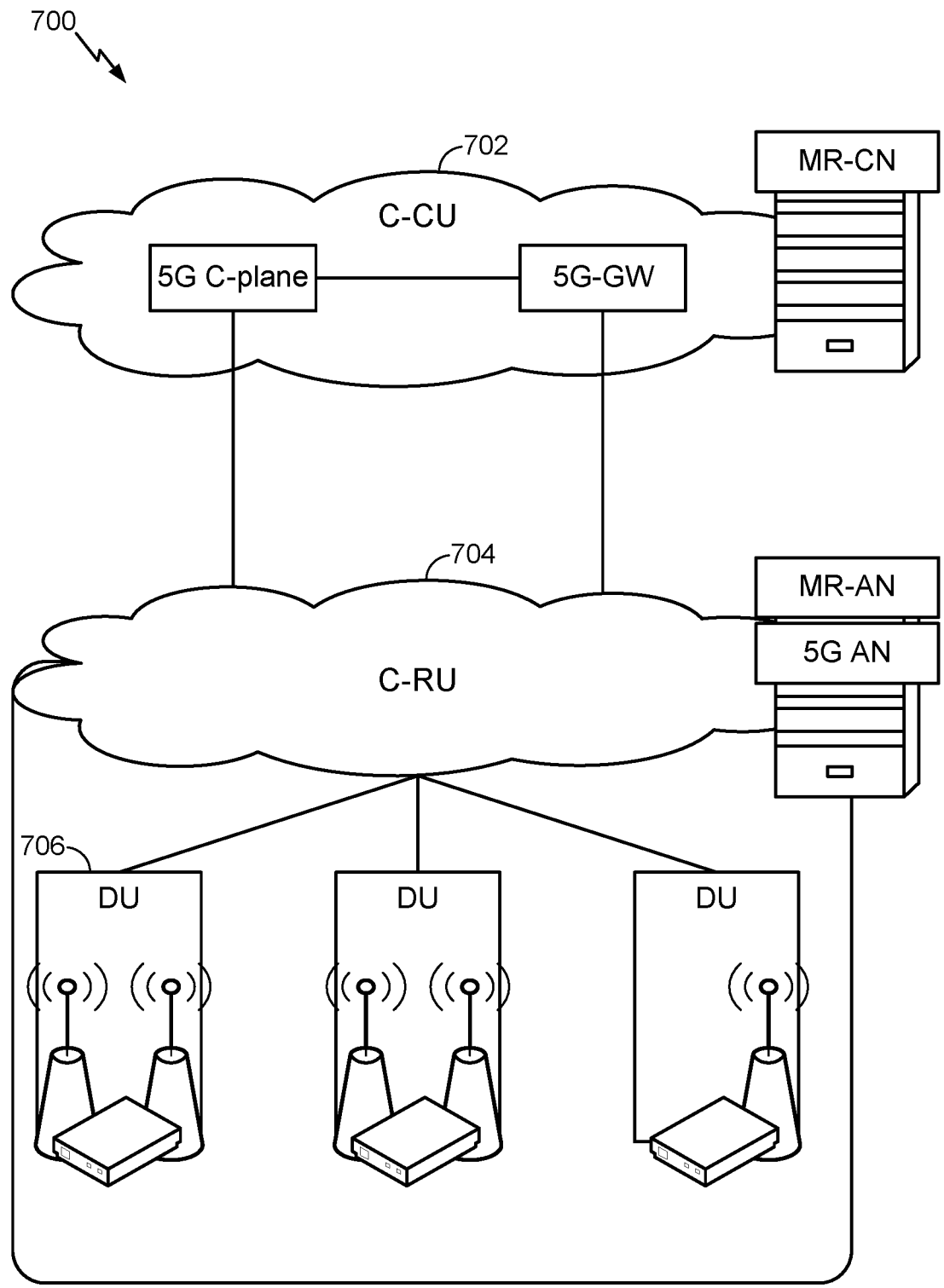
FIG. 7 illustrates an example physical architecture of a distributed RAN, in accordance with certain aspects of the present disclosure.

FIG. 7 illustrates an example physical architecture 700 of a distributed RAN, according to aspects of the present disclosure. A centralized core network unit (C-CU) 702 may host core network functions. C-CU 702 may be centrally deployed. C-CU 702 functionality may be offloaded (e.g., to advanced wireless services (AWS)), in an effort to handle peak capacity.

A centralized RAN unit (C-RU) 704 may host one or more ANC functions. Optionally, C-RU 704 may host core network functions locally. C-RU 704 may have distributed deployment. C-RU 704 may be closer to the network edge.

A distributed unit (DU) 706 may host one or more TRPs. DU 706 may be located at edges of the network with radio frequency (RF) functionality.

Figure 8:
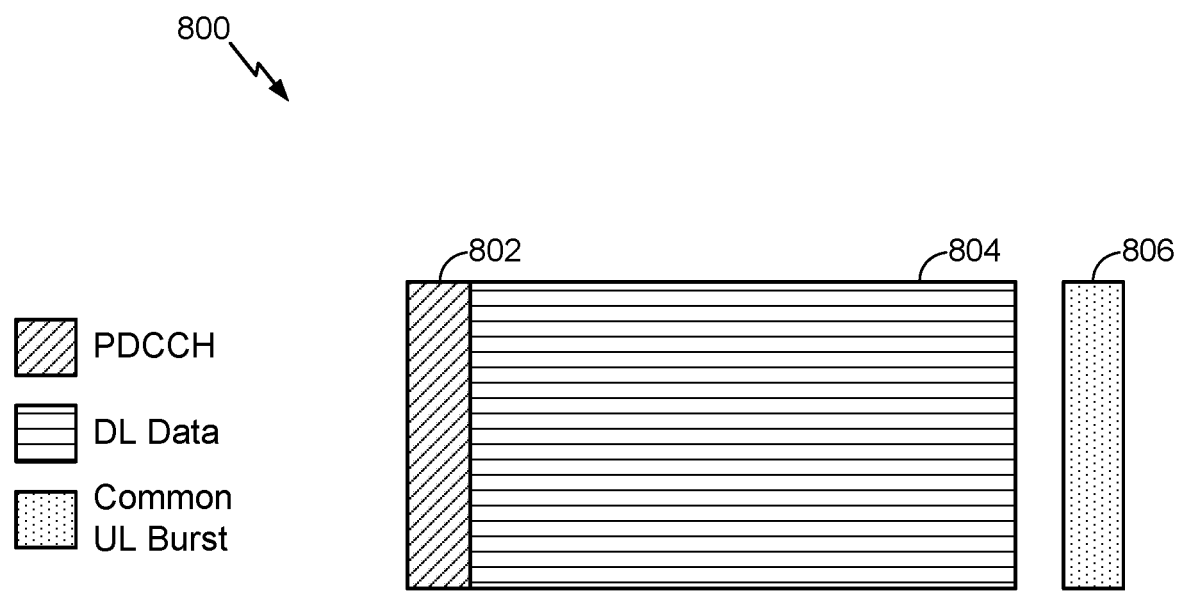
FIG. 8 is a diagram illustrating an example of a downlink (DL)-centric subframe, in accordance with certain aspects of the present disclosure.

FIG. 8 is a diagram showing an example of a DL-centric subframe 800. DL-centric subframe 800 may include a control portion 802. Control portion 802 may exist in the initial or beginning portion of DL-centric subframe 800. Control portion 802 may include various scheduling information and/or control information corresponding to various portions of DL-centric subframe 800. In some configurations, control portion 802 may be a physical DL control channel (PDCCH), as indicated in FIG. 8. DL-centric subframe 800 may also include a DL data portion 804. DL data portion 804 may sometimes be referred to as the payload of DL-centric subframe 800. DL data portion 804 may include the communication resources utilized to communicate DL data from the scheduling entity (e.g., BS or UE) to the subordinate entity (e.g., BS or UE). In some configurations, DL data portion 804 may be a physical DL shared channel (PDSCH).

DL-centric subframe 800 may also include a common UL portion 806. Common UL portion 806 may sometimes be referred to as an UL burst, a common UL burst, and/or various other suitable terms. Common UL portion 806 may include feedback information corresponding to various other portions of DL-centric subframe 800. For example, common UL portion 806 may include feedback information corresponding to control portion 802. Non-limiting examples of feedback information may include an acknowledgment (ACK) signal, a negative acknowledgment (NACK) signal, a HARQ indicator, and/or various other suitable types of information. Common UL portion 806 may include additional or alternative information, such as information pertaining to random access channel (RACH) procedures, scheduling requests (SRs), and various other suitable types of information.

As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity) to UL communication (e.g., transmission by the subordinate entity). The foregoing is merely one example of a DL-centric subframe and alternative structures having similar features may exist without necessarily deviating from the aspects described herein.

Figure 9:
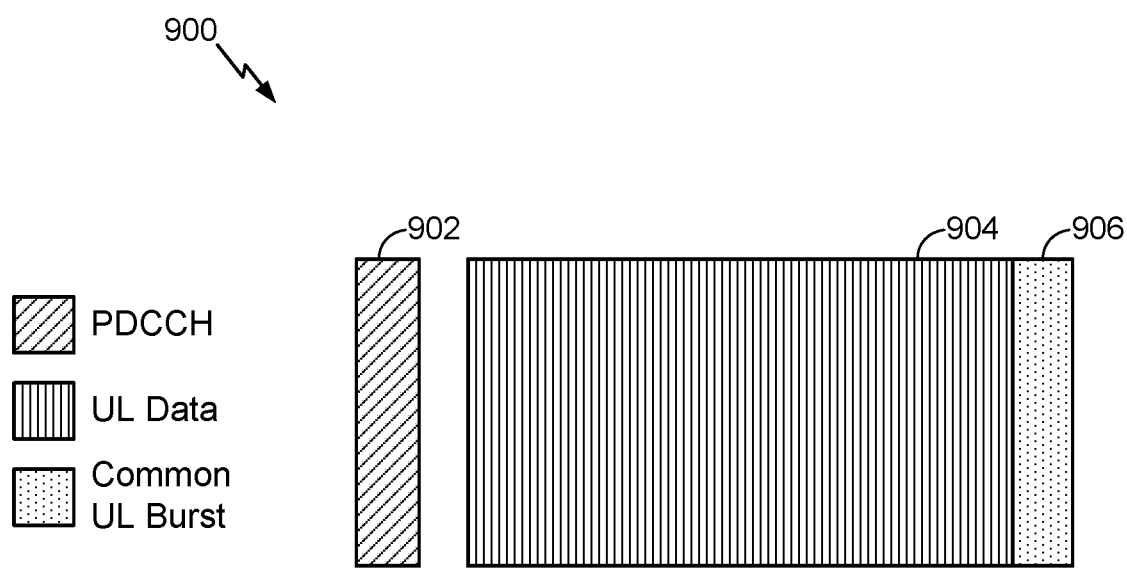
FIG. 9 is a diagram illustrating an example of an uplink (UL)-centric subframe, in accordance with certain aspects of the present disclosure.

FIG. 9 is a diagram showing an example of an UL-centric subframe 900. UL-centric subframe 900 may include a control portion 902. Control portion 902 may exist in the initial or beginning portion of UL-centric subframe 900. Control portion 902 in FIG. 9 may be similar to the control portion 802 described above with reference to FIG. 8. UL-centric subframe 900 may also include UL data portion 904. UL data portion 904 may sometimes be referred to as the payload of the UL-centric subframe. UL data portion 904 may refer to the communication resources utilized to communicate UL data from the subordinate entity to the scheduling entity. In some configurations, control portion 902 may be a PDCCH. As illustrated in FIG. 9, the end of control portion 902 may be separated in time from the beginning of the UL data portion 904. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

UL-centric subframe 900 may also include a common UL portion 906. Common UL portion 906 in UL-centric subframe 900 may be similar to common UL portion 806 described above with reference to DL-centric subframe 800. Common UL portion 906 may additionally or alternatively include information pertaining to CQI, sounding reference signals (SRSs), and various other suitable types of information. The foregoing is merely one example of an UL-centric subframe and alternative structures having similar features may exist without necessarily deviating from the aspects described herein.

In some circumstances, two or more subordinate entities may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical (MiCr) mesh, and/or various other suitable applications. Generally, a sidelink signal may refer to a signal communicated from one subordinate entity (e.g., $UE_1$) to another subordinate entity (e.g., $UE_2$) without relaying that communication through the scheduling entity (e.g., BS or UE), even though the scheduling entity may be utilized for scheduling and/or control purposes. In some examples, the sidelink signals may be communicated using a licensed spectrum (unlike wireless local area networks, which typically use an unlicensed spectrum).

Example Linkage and Indication of HARQ Packet Transmissions and Parameters for URLLC in NR Certain systems, such as new radio (NR) (e.g., 5G technology) systems, may include support for Enhanced Mobile Broadband (eMBB) service targeting wide bandwidth (e.g., 80 MHz bandwidth or beyond), support for millimeter wave (mmW) service targeting high carrier frequency (e.g., 60

GHz or beyond), support for massive machine type communications (mMTC) targeting non-backward compatible MTC techniques, and/or mission critical (MiCr) service targeting ultra-reliable low-latency communications (URLLC) service.

Certain services supported by wireless communication systems may include latency and reliability requirements. Latency in a network may refer to the amount of time required for a packet of data to get from one point in the network to another point in the network. For example, latency in the user plane may be defined based on the time required for a successful deliver of an application layer packet from a layer 2 or 3 medium access control (MAC) service data units (SDUs) ingress point to a layer 2 or 3 MAC SDU egress point through a radio interface. Reliability in a network may refer to a probability of successfully transmitting X number of bytes within 1 ms, where 1 ms is the time to deliver a small packet from a protocol layer 2 or 3 SDU ingress point to an egress point, at a certain channel quality.

ULRRC may be associated with relatively tight (e.g., stringent) requirements for both control and data channels. For example, URLLC may have a target block error rate (BLER) (e.g., a reliability requirement) of around $10^{-5}$ or lower (e.g., $10^{-9}$) and a target latency of around 0.5 ms (or 1 ms). Due to the stringent requirements for URLLC, it may difficult to achieve the target BLER with a single transmission. Thus, HARQ operations may be desirable.

For HARQ operation, a transmitter (e.g., a BS 110) may send one or more transmissions and/or retransmissions of a packet (e.g., a transport block (TB)) until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

Control channels may accompany each data transmission, or may be omitted for the first transmission (e.g., semi-persistent scheduling (SPS)). Regardless, it may be desirable to ensure that the UE can combine different HARQ transmissions for the same TB of a packet to achieve the target BLER (e.g., three transmissions each targeting $10^{-3}$). However, current fully-adaptive control channel design and asynchronous HARQ implies that the control channel is only relevant for the current transmission. Thus, if the UE misses the control channel for a given transmission, the UE does not decode the data and the corresponding data is, therefore, not available for HARQ combining. When receiving a current transmission of a packet, the UE may not know how many previous HARQ transmissions of the packet have already been performed. Further, asynchronous HARQ introduces additional time variations making HARQ combining more difficult.

Accordingly, techniques for HARQ combining for URLLC for NR are desirable. Aspects described herein provide methods and apparatus for performing combining of a current packet transmission with previous HARQ transmissions (e.g., buffered samples of missed packet transmissions) of the packet. In order to effectively perform the combining, the UE may need to be aware of previous HARQ transmissions, for example, which may not have been decoded if the UE missed the associated control channel for the data. Aspects of the present disclosure relate to linkage and indication of HARQ packet transmissions (e.g., physical downlink shared channel (PDSCH) for URLLC in NR.

Figure 10:
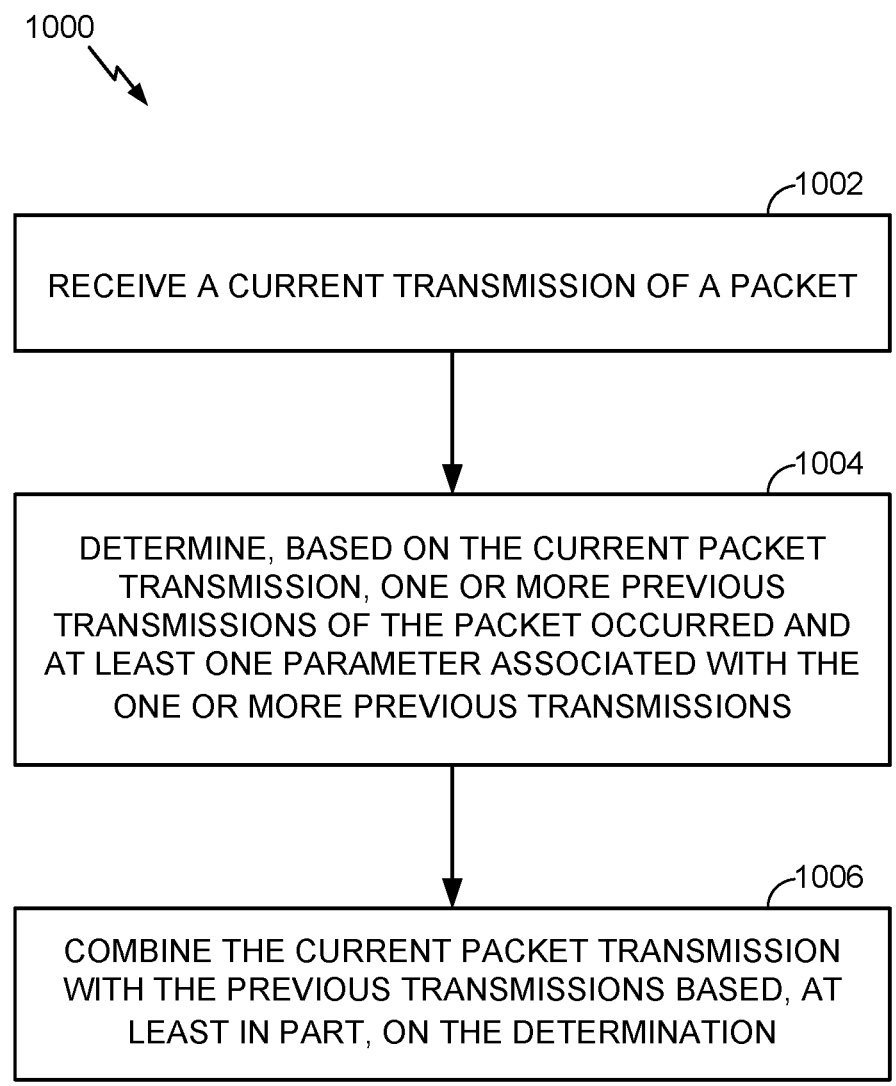
FIG. 10 illustrates example operations performed, by a UE, for hybrid automatic repeat request (HARQ) combining, in accordance with certain aspects of the present disclosure.

FIG. 10 illustrates example operations 1000 for HARQ combining, in accordance with certain aspects of the present disclosure. Operations 1000 may be performed, for example, by a UE (e.g., UE 120). As illustrated, operations 1000 begin, at 1002, by receiving a current transmission of a packet (e.g., a HARQ retransmission of a TB).

At 1004, the UE determines, based on the current packet transmission, one or more previous transmissions (e.g., transmission or HARQ retransmission) of the packet occurred and at least one parameter associated with the one or more previous transmissions. According to certain aspects, the at least one parameter may include time or frequency resources of the previous transmissions, the number of previous transmissions, a redundancy version (RV) of the previous transmissions, and/or a modulation and coding scheme (MCS) of the previous transmissions. According to certain aspects, the parameter can be determined based on an explicit indication in downlink control information, the parameter may be fixed across HARQ transmissions of the TB, or there may be a mapping or pattern for the parameter across HARQ transmissions of the TB. In some cases, the parameter may be indicated in a control channel along with the scheduling for the current transmissions. Alternatively, the parameter may be indicated in a separate control channel in the same TTI. According to certain aspects, the previous transmission may be on a different component carrier (CC) than the current transmission. The previous transmission may be in the same or a different TTI.

At 1006, the UE combines the current packet transmission with the previous transmissions based, at least in part, on the determination. The combining may be further based on at least one of a target error rate, a service type, a quality-of-service (QoS) indicator, a UE capability, a UE category, or a configuration.

According to certain aspects, the URLLC, buffering, and techniques for determining previous transmissions may be based on UE capability. For example, URLCC may be associated with a high UE category. In aspects, if the UE is not capable, these features may be turned off.

Example Parameter Linkage Across HARQ Transmissions

Figure 11:
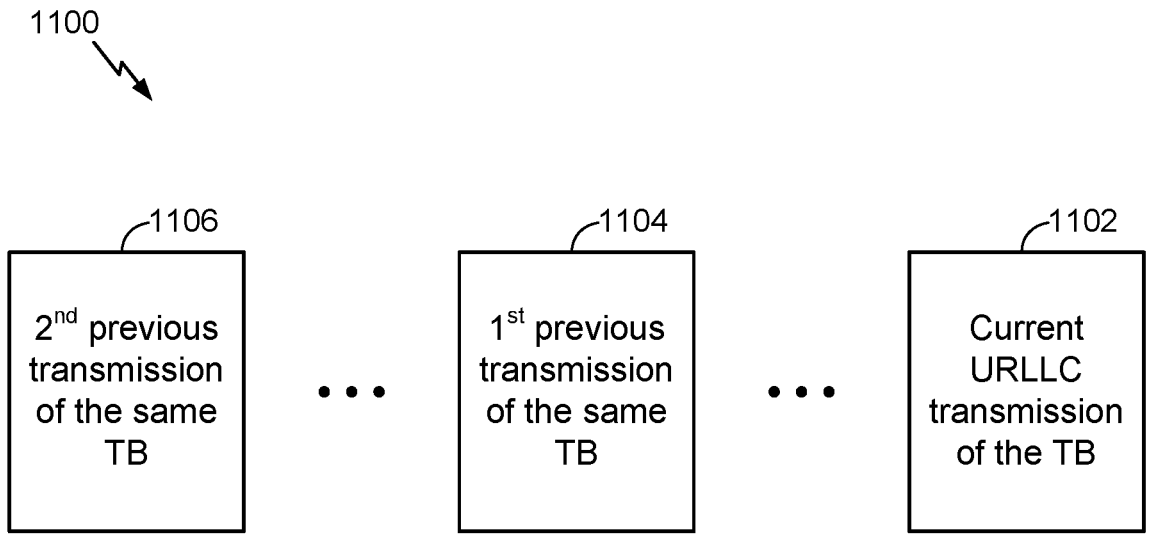
FIG. 11 illustrates HARQ transmissions of a transport block (TB), in accordance with certain aspects of the present disclosure.

In order to aid the UE in performing channel estimation and HARQ combining for current URLLC transmission of the TB 1102, shown in FIG. 11, the UE may use buffered samples of missed HARQ transmissions, such as the $1^{st}$ previous transmission of the TB 1104, and/or the $2^{nd}$ previous TX of the same TB 1106 shown in FIG. 11.

According to certain aspects, parameters can be linked across HARQ transmissions in order to allow the UE to determine the parameter of previous transmissions based on a current transmission. For example, the UE may determine information (e.g., parameters) regarding the previous (e.g., missed) HARQ transmissions 1104 and/or 1106 based on the current URLLC transmission of the TB 1102.

According to certain aspects, the information can be explicitly indicated to the UE. For example, the UE may determine the information regarding the previous HARQ transmissions 1104 and/or 1106 in downlink control information (DCI) associated with the current URLLC transmission of the TB 1102 (e.g., in a control channel in the same TTI). Alternatively, the UE can determine the information implicitly based on linkage of parameters, for example, based on a pattern, mapping, or index associated with the parameters for transmissions of the TB. In an example, parameters can be fixed for HARQ transmissions of the same TB (i.e., the same parameters used for different HARQ transmissions).

Thus, from the currently packet transmission (e.g., a PDSCH), the UE may determine whether previous HARQ transmissions of the same TB have occurred (e.g., even if the associated control channels of some of the previous transmissions were missed). The UE may also be able to determine the corresponding parameters associated with the previous HARQ transmissions of the same TB.

According to certain aspects, data transmissions may have dynamic TTI lengths. In aspects, the same or different TTI length may be used for HARQ transmissions for the same TB. In aspects, the TTI length can be UE-specific. In aspects, the PDSCH of the current transmission may be omitted (e.g., if current TTI is crowded), and the control information in the current transmission may be used for determination the information regarding the previous HARQ transmissions (for which the control channel was missed) and the UE may rely on the previous PDSCH transmission(s) for decoding (e.g., channel estimation and combining).

Example Determination of Time of Previous HARQ Transmissions

According to certain aspects, a parameter of the previous HARQ transmissions that may be determined is the time domain location of the previous HARQ transmissions.

Figure 12:
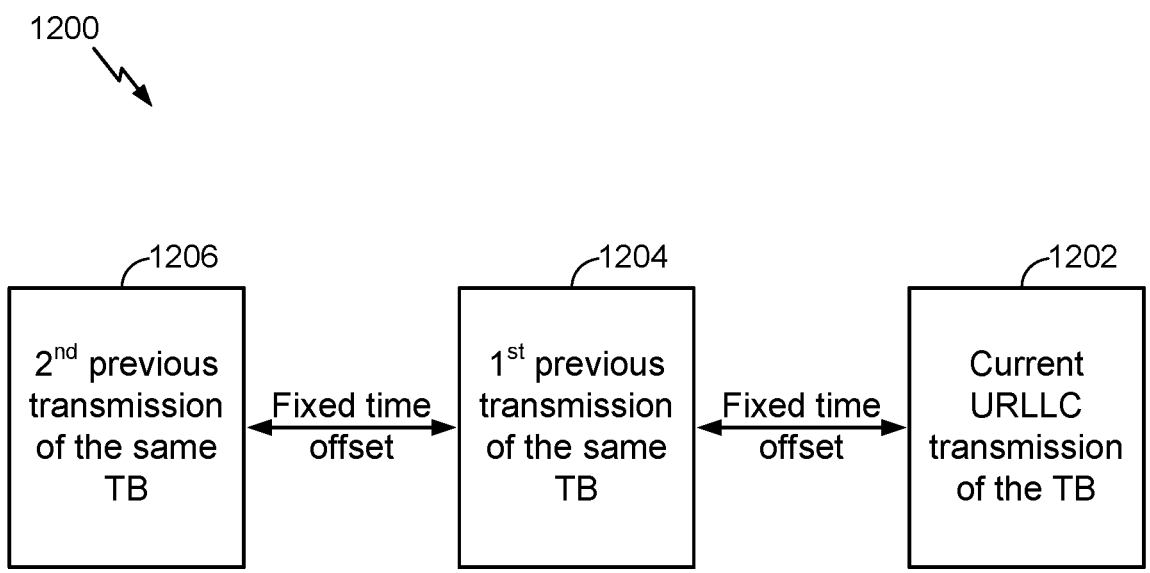
FIG. 12 illustrates HARQ transmissions of a TB at a fixed time offset, in accordance with certain aspects of the present disclosure.

For synchronous HARQ operation (for both DL and UL URLLC), the first (e.g., initial) transmission can be based on dynamic scheduling similar to packet switching, but re-transmissions may exhibit properties similar to circuit switching. From the current packet transmission, the UE can figure out the times at which previous transmissions of the packet occurred. For example, for synchronous HARQ, transmissions of a TB may occur at a fixed time offset as shown in FIG. 12. The time offset may be a function of other parameters, such as a function of the number of symbols (e.g., TTI length) used for the current URLLC transmission of the TB 1202.

Alternatively, for asynchronous HARQ, the time location of previous transmissions may be explicitly indicated in DCI (e.g., in a control channel associated with the current transmission).

Example Determination of Number of Previous HARQ Transmissions

According to certain aspects, a parameter of the previous HARQ transmissions that may be determined is the number of the previous HARQ transmissions that have occurred.

In certain systems (e.g., LTE), a single bit in a transmission can be used as a new data indicator (NDI) to indicate whether the current transmission is a new/initial transmission (e.g., a new TB) or a HARQ re-transmission of a TB. Generally, for asynchronous HARQ, there is no counter for the number of HARQ transmissions for a TB. For sync UL HARQ, the UE maintains a counter to count the number of HARQ transmissions, but the counter is subject to misalignment (e.g., if the UE misses the first transmission).

Figure 13:
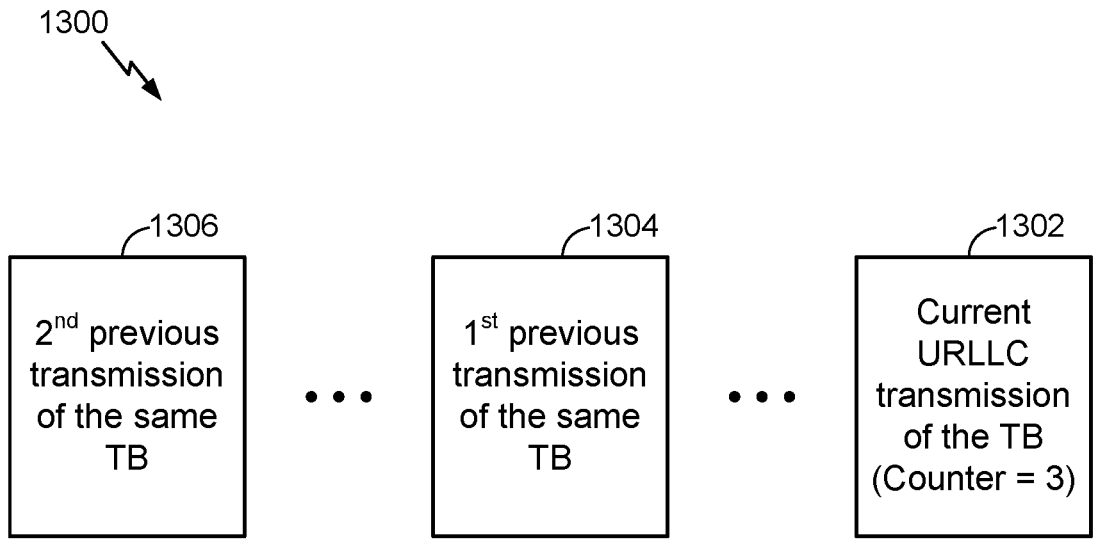
FIG. 13 illustrates HARQ transmissions of a TB with a counter indication, in accordance with certain aspects of the present disclosure.

For URLLC, the number of HARQ transmissions for a TB may be aligned to ensure HARQ combining. According to certain aspects, an explicit counter indication may be provided in the current transmission to indicate the number of transmissions (including the current one) that have occurred for the TB. In an example, the counter may be provided in DCI, which may be in a control channel associated with the current transmission. For example, as shown in FIG. 13, current URLLC transmission of the TB 1302 may have a counter indicating it is the third transmission of the TB (as there were two previous transmissions on the TB 1304, 1306). From the counter, the UE can determine the number of previous transmissions for the same TB (i.e., the number indicated by the counter−1).

According to certain aspects, the NDI can be omitted since a value of 0 for the counter indicates that it is a first transmission for a TB.

Example Determination of RV for Previous HARQ Transmissions

According to certain aspects, one parameter of the previous HARQ transmissions that may be determined is the redundancy version (RV) the previous HARQ transmissions that have occurred.

Figure 14:
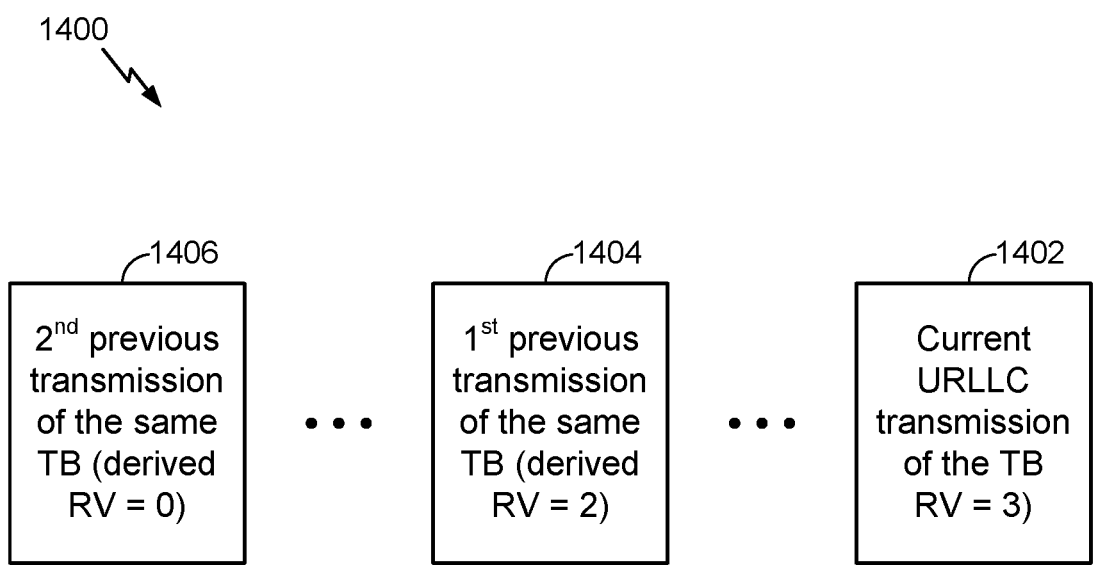
FIG. 14 illustrates HARQ transmissions of a TB and redundancy version (RV) values, in accordance with certain aspects of the present disclosure.

For synchronous HARQ, the RV can be determined based on an index (e.g., mapping) of the number of HARQ transmissions to RV. For example, an index for the $1^{st}$, $2^{nd}$, $3^{rd}$, and $4^{th}$ transmissions may indicate RV={0, 2, 3, 1}, respectively, for the transmissions. Thus, the RV determination may also use the counter discussed in the section above, such that the UE can also determine which number the transmission is. For example, as shown in FIG. 14, if the UE knows that the current URRLC transmission of the TB 1402 is the third HARQ transmission (e.g., based on the counter), then based on the index the UE may know the RV of the current URRLC transmission of the TB 1402 (e.g., RV=3 in this example) and can determine the RV of the $1^{st}$ and $2^{nd}$ previous HARQ transmissions 1404, 1406, as well. Alternatively, the RV may be explicitly indicated in DCI.

For asynchronous HARQ, the RV may be based on the index of the number of HARQ transmissions (e.g., and may omitted from the DCI), or may be explicitly indicated in DCI for the current and/or previous transmissions. For example, the UE may derive the RV for the $1^{st}$ and $2^{nd}$ previous transmissions 1404, 1406 based on the RV of the current URLLC transmission of the TB 1402 and the counter. In an example, the UE may assume that RV is always 0 for first transmission. Then, based on current RV indication and the counter, the UE can derive the RV for the previous transmissions as:

$RV_{previous}=(RV_{current}-\text{difference in counter})\bmod 4$

Thus, if the current transmission is a third transmission having $RV_{current}=2$, then the UE may determine that the $1^{st}$ transmission has RV=0 and the $2^{nd}$ transmission has RV=2−1=1.

Alternatively, the RV may be fixed for the HARQ transmissions. For example, a same RV may be used for all HARQ transmissions of the same TB (e.g., RV=0). In this case, each transmission may be self-decodable Example Determination of Resources for Previous HARQ Transmissions According to certain aspects, one parameter of the previous HARQ transmissions that may be determined is the time and/or frequency resources used for the previous HARQ transmissions.

According to certain aspects, a same resource allocation size may be used for all HARQ transmissions of a TB. In some cases, the size for the TB can be dynamically scheduled.

Alternatively, the resource allocation size and/or location can be different for different HARQ transmissions of the TB. However, the resource allocation size and/or location may follow a pattern, mapping, or predefined rules (e.g., linked) such that UE can determine the resources of the previous transmissions of the packet based on resources used for the current packet transmission. In one example, for turbo-HARQ, the UE may determine that the resource assignment size for the current transmission 50 resource blocks (RBs). Based on the pattern, mapping, or predefined rules, the UE may further determine that the location of the previous transmission is the center 25 RBs.

Figure 15:
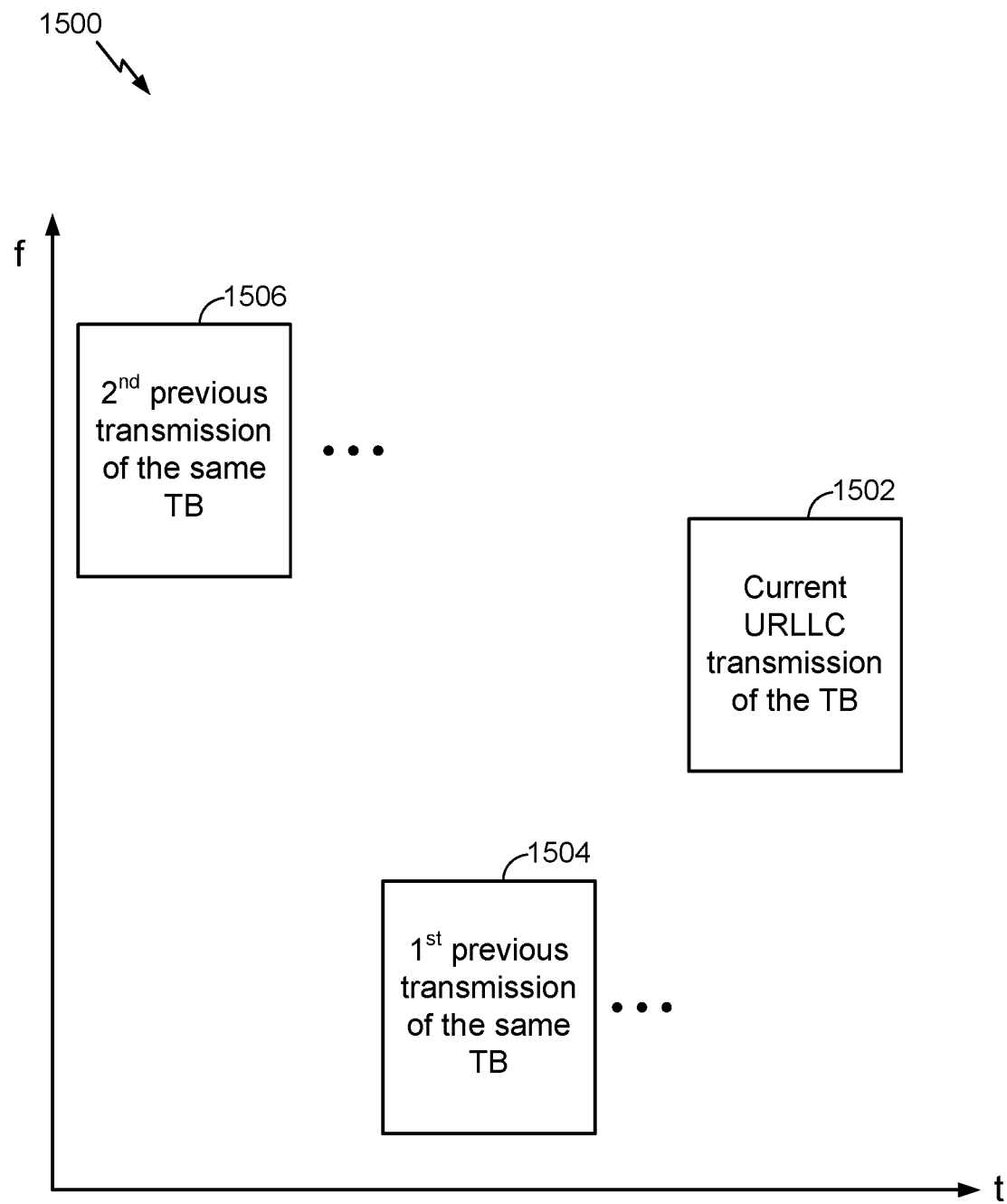
FIG. 15 illustrates HARQ transmissions of a TB with frequency hopping, in accordance with certain aspects of the present disclosure.

According to certain aspects, HARQ transmissions may be frequency hopped, for example, according to a predefined rule, mapping, or pattern. As shown in FIG. 15, the current URLCC transmission of the TB 1502 may be frequency hopped from the $1^{st}$ previous transmission of the TB 1504, which in turn may be frequency hopped from the $2^{nd}$ previous transmission of the TB 1506. The frequency hopping may be linked with the current URLLC parameters (e.g., offset-based hopping, mirror hopping, etc.).

In another alternative, the resources may be fixed across HARQ transmissions of the same TB.

In yet another alternative, the resources for the previous transmissions may be explicitly indicated in DCI, for example, in a control channel associated with the current transmission.

According to certain aspects, an information field may be added to the transmissions to indicate whether previous transmissions are transmitted using different resources and, if so, how the resources vary (e.g., a linkage, pattern, or mapping of the resources). HARQ operations may be similar to turbo HARQ, where the last transmission(s) may have increased resource allocations to finish the transmission before the deadline Example Determination of MCS for Previous HARQ Transmissions According to certain aspects, one parameter of the previous HARQ transmissions that may be determined is the modulation coding scheme (MCS) used for the previous HARQ transmissions.

According to certain aspects, a fixed MCS may be used for HARQ transmissions of the same TB. However, the MCS may be dynamically scheduled for the TB. According to certain aspects, if resource allocation size varies across HARQ transmissions of the same TB, the same modulation order may be used—in this case, the coding rate may change accordingly.

According to certain aspects, an information field may be added to the transmissions to indicate whether previous transmissions were transmitted using different MCS and, if so, how the MCS vary (e.g., a linkage, pattern, or mapping of the MCS). HARQ operations may be similar to turbo HARQ, where the last transmission(s) may have increased resource allocations to finish the transmission before the deadline Example Single-Control Channel or Separate Control Channel for Current TTI According to certain aspects, information regarding previous HARQ transmissions may be sent in the same control as the control channel carrying scheduling information for the current transmission. Alternatively, the information regarding previous HARQ transmissions may be sent in a separate control channel, within the same TTI as the current transmission. In another alternative, the information regarding previous HARQ transmissions may not be explicitly indicated in any control channel, but may be determined implicitly based on linkage of parameters between the current transmission and previous transmissions. Thus, there may be flexibility for scheduling parameters across HARQ transmissions for a TB.

According to certain aspects, the resources and/or payload sizes used for control channel across different HARQ transmissions for the same TB can be different. For example, different aggregation levels and/or transmit powers may be used across different transmissions.

According to certain aspects, if there are multiple channels within a TTI bundle, the control channels may have a linkage design similar to as described herein for the data. For example, TTI bundling for HARQ re-transmissions can be viewed as with zero or close to zero HARQ round-trip-time (RTT) versus regular HARQ re-transmissions with a certain RTT.

Example Buffering of Previous HARQ Transmissions

According to certain aspects, the UE may buffer samples associated with previous HARQ transmissions of the TB in order to perform channel estimation and combining. If the UE misses a previous control channel associated with a previous HARQ packet transmission, the UE may not decode the data but can still buffer corresponding data samples. Since the duration for the entire HARQ transmission of a TB for URLLC is limited, the buffering requirements may not be high for URLLC (e.g., the UE may only buffer around 1 ms worth of samples, which can be updated based on a sliding window).

According to certain aspects, the buffering may be aligned with the system bandwidth or a smaller bandwidth. For example, for narrowband data communications, the buffering may be limited to the narrowband. In some cases, the buffering may be limited to a bandwidth smaller than the data bandwidth. In some cases, the buffering may be performed for different bandwidth for different transmissions. In one example, if the current transmission is already the last transmission, the BS may schedule full bandwidth to increase the chance of completing the packet.

According to certain aspects, the buffering may be limited to a particular number of previous transmissions. For example, the UE may only buffer the previous HARQ transmission immediately preceding the current transmission. Accordingly, the linkage may be limited to whether or not there is an immediate preceding transmission for the same TB. In this way, a tradeoff between complexity and performance can be achieved.

According to certain aspects, the techniques described above may be used for uplink or downlink. In the case of uplink, if the UE misses an uplink grant, there may be a remedy transmission. For example, a current transmission may indicate for additional resources to be transmitted due to a missed previous transmission.

According to certain aspects, the BS may perform discontinuous reception (DRX) versus ACK/NAK detection to decide scheduling.

According to certain aspects, to reduce UE complexity, buffering requirements, and decoding delay, the UE may trace back to a limited number of previous transmissions for a TB. For example, the UE may trace back only one transmission, such that if there are previous two or more transmissions all with the control channel detection missed, only the immediate previous one is recovered for PDSCH decoding. Thus, the UE may only perform trace-back channel estimation and log likelihood ratio (LLR) computation for one instance and may only buffer a duration covering two HARQ transmissions.

Example Determination of Cross-Carrier and/or Cross-Subframe Previous HARQ Transmissions According to certain aspects, the current transmission may be transmitted on a different CC (e.g., for carrier aggregation (CA) or dual connectivity (DC)) in the same or different TTI as a previous HARQ transmission. According to certain aspects, the UE can determine the parameters of the transmission on the other CC using similar linkage of parameters as described herein.

If the UE is multi-CC capable, the UE may utilize processing power reserved for other CCs (but not scheduled) for buffering and complexity involved on the given CC.

By receiving an indication in a current packet transmission (e.g., an explicit indication or an implicit indication based on linkage of parameters), the UE can be aware of previous HARQ transmissions of the packet and parameters associated with the previous HARQ transmissions, which the UE can use for better channel estimation and HARQ combining, which may be useful in the case of URLLC for NR.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving a current transmission of a packet including a counter indicating a number of one or more previous transmissions of the packet;
   determining, based on the current packet transmission, one or more previous transmissions of the packet occurred and the number of the one or more previous transmissions of the packet, the one or more previous transmissions of the packet including at least one previous transmission for which an associated control channel was not received by the UE; and
   combining the current packet transmission with the one or more previous transmissions based on the determination.

2. The method of claim 1, wherein the current packet transmission and the one or more previous transmissions comprise hybrid automatic repeat request (HARQ) retransmissions of the packet.

3. The method of claim 1, wherein the combining is further based on at least one of: a target error rate, a service type, a quality-of-service (QoS) indicator, or a configuration.

4. The method of claim 1, further comprising determining, based on the current packet transmission, at least one of: time resources or frequency resources used for the one or more previous transmissions.

5. The method of claim 4, wherein the determination of the at least one of: time resources or frequency resources used for the one or more previous transmissions is based on an explicit indication in control information associated with the current packet transmission.

6. The method of claim 1, further comprising determining, based on the current packet transmission, a redundancy version (RV) of the one or more previous transmissions.

7. The method of claim 6, wherein determining the RV is based on an explicit indication in control information associated with the current packet transmission.

8. The method of claim 4, wherein at least one of: a size or a location of the at least one of: time resources or frequency resource used for the one or more previous transmissions is fixed.

9. The method of claim 4, wherein the determination of the at least one of: time resources or frequency resources used for the one or more previous transmissions is based on a mapping or a pattern of the one or more previous transmissions to the at least one of: time resources or frequency resources.

10. The method of claim 4, wherein the determination of the frequency resources used for the one or more previous transmissions is based on frequency resources used for the current packet transmission and a frequency hopping pattern.

11. The method of claim 1, further comprising determining, based on the current packet transmission, a modulation and coding scheme (MCS) used for the one or more previous transmissions.

12. The method of claim 11, wherein the MCS for the current packet transmission and the one or more previous transmissions is fixed.

13. The method of claim 1, wherein:
    the current packet transmission is received in a transmission time interval (TTI); and
    the method further comprises:
    receiving a first control channel in the TTI indicating the at least one parameter; and
    receiving a second control channel in the TTI indicating scheduling for the current packet transmission.

14. The method of claim 1, wherein:
    the current packet transmission is received in a transmission time interval (TTI); and
    the method further comprises receiving a control channel in the TTI indicating the at least one parameter and scheduling for the current packet transmission.

15. The method of claim 1, further comprising:
    buffering data samples associated with at least one of the one or more previous transmissions.

16. The method of claim 1, wherein the current packet transmission and the one or more previous transmissions have a fixed transmission time interval (TTI) length.

17. The method of claim 1, wherein the current packet transmission and the one or more previous transmissions have a different transmission time interval (TTI) length.

18. The method of claim 1, wherein the current packet transmission does not include data.

19. The method of claim 1, wherein the determination and combining is based on at least one of: a capability of the UE, a category of the UE, or a configuration of the UE.

20. The method of claim 1, wherein the combining is limited to combining the current packet transmission with an immediate previous transmission.

21. The method of claim 1, further comprising:
identifying a first component carrier (CC) on which the current packet transmission is carried; and
identifying a second CC on which a second transmission is carried based on the current packet transmission on the first CC.

22. An apparatus for wireless communications by a user equipment (UE), comprising:
means for receiving a current transmission of a packet including a counter indicating a number of one or more previous transmissions of the packet;
means for determining, based on the current packet transmission, one or more previous transmissions of the packet occurred and the number of the one or more previous transmissions of the packet, the one or more previous transmissions of the packet including at least one previous transmission for which an associated control channel was not received by the UE; and
means for combining the current packet transmission with the one or more previous transmissions based on the determination.

23. The apparatus of claim 22, wherein the current packet transmission and the one or more previous transmissions comprise hybrid automatic repeat request (HARQ) retransmissions of the packet.

24. The apparatus of claim 22, further comprising determining, based on the current packet transmission, at least one of: time resources or frequency resources used for the one or more previous transmissions.

25. The apparatus of claim 24, wherein the determination of the at least one of: time resources or frequency resources used for the one or more previous transmissions is based on an explicit indication in control information associated with the current packet transmission.

26. The apparatus of claim 24, wherein the determination of the at least one of:
time resources or frequency resources used for the one or more previous transmissions is based on a mapping or a pattern of the one or more previous transmissions to the at least one of:
time resources or frequency resources.

27. An apparatus for wireless communications by a user equipment (UE), comprising:
at least one processor configured to:
receive a current transmission of a packet including a counter indicating a number of one or more previous transmissions of the packet;
determine, based on the current packet transmission, one or more previous transmissions of the packet occurred and the number of the one or more previous transmissions of the packet, the one or more previous transmissions of the packet including at least one previous transmission for which an associated control channel was not received by the UE; and
combine the current packet transmission with the one or more previous transmissions based on the determination; and
a memory coupled with the at least one processor.

28. A non-transitory computer readable medium having computer executable code stored thereon for wireless communications by a user equipment (UE), comprising:
code for receiving a current transmission of a packet including a counter indicating a number of one or more previous transmissions of the packet;
code for determining, based on the current packet transmission, one or more previous transmissions of the packet occurred and the number of the one or more previous transmissions of the packet, the one or more previous transmissions of the packet including at least one previous transmission for which an associated control channel was not received by the UE; and
code for combining the current packet transmission with the one or more previous transmissions based on the determination.

29. The method of claim 1, wherein the at least one previous transmission was not received by the UE and was not buffered by the UE.

30. The apparatus of claim 22, wherein the at least one previous transmission was not received by the UE and was not buffered by the UE.

31. The apparatus of claim 27, wherein the at least one previous transmission was not received by the UE and was not buffered by the UE.

32. The non-transitory computer readable medium of claim 28, wherein the at least one previous transmission was not received by the UE and was not buffered by the UE.

* * * * *